Figure 1:
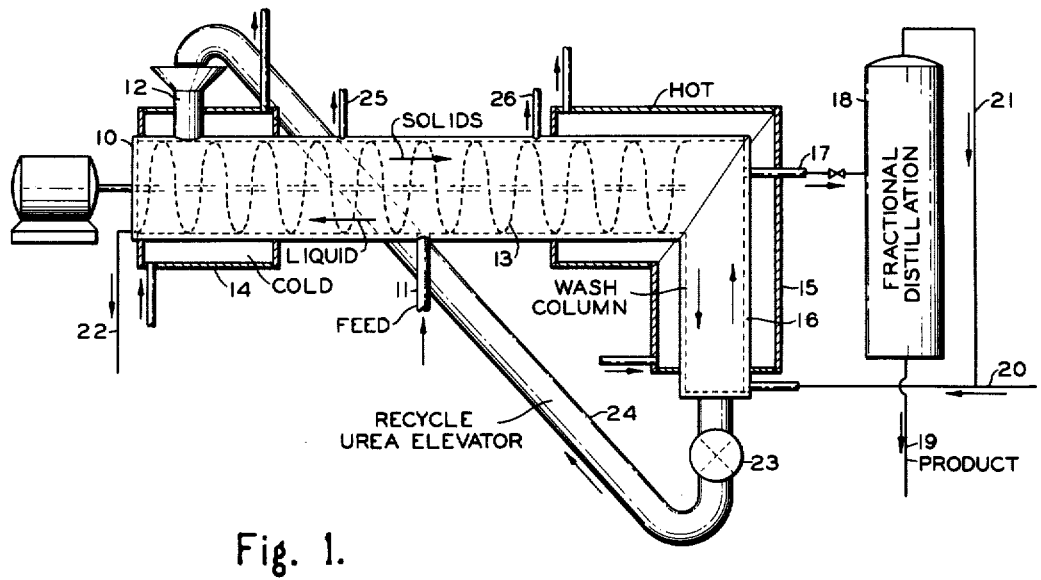

United States Patent Office

2,735,843
Patented Feb. 21, 1956

2,735,843

FRACTIONATION PROCESS

John A. Weedman, Bartlesville, Okla., assignor to Phillips Petroleum Company, a corporation of Delaware Application August 21, 1951, Serial No. 242,818

13 Claims. (Cl. 260—96.5)

This invention relates to a process for the fractionation of a mixture of organic compounds. In one of its aspects it relates to a process for the fractionation of a mixture of organic compounds having similar carbon atom configuration. In a specific embodiment it relates to a process for the resolution of a mixture of hydrocarbons having similar carbon atom configuration.

In the prior art it is known that urea will react with certain straight carbon atom chain organic compounds to form a solid adduct. It is also known that thiourea will form a solid adduct with certain branched carbon atom chain organic compounds. In accordance with this knowledge, there has been provided a process for the separation of organic compounds, which process permits the separation of a class of compounds having one type of molecular arrangement from a class of compounds having a different type of molecular arrangement. Thus, straight chain hydrocarbons can be separated, individually or as a class, from branched chain and/or cyclic hydrocarbons independently of the boiling points of the compounds being separated. This process depends upon the peculiar property of urea, $CO(NH_2)_2$, which permits it to form an adduct with organic compounds having straight carbon atom chains and yet not to form an adduct with branched chain or cyclic organic compounds. Thus, in such a process it is possible to separate n-octane from 2,2,4-trimethylhexane, isooctane, or branched chain hydrocarbons irrespective of the boiling points. Also, straight-chain hydrocarbons can be readily separated from aromatic hydrocarbons, for example benzene or toluene, or from the cycloparaffins, irrespective of the boiling points thereof.

While urea forms adducts with organic compounds having straight carbon atom chains, thiourea, $CS(NH_2)_2$, forms adducts with certain organic compounds having branched or cyclic carbon atom chains. Thus, the adduct-forming property of thiourea permits a ready separation of such compounds from organic compounds having straight carbon atom chains since the latter do not form adducts with thiourea. The adducts thus formed with either thiourea or urea are readily recoverable by filtration or other suitable means from the organic compounds that form no adducts with urea or thiourea, and then the adducts can be dissociated to recover the urea or thiourea, as the case may be, and the adduct-forming organic compounds. This dissociation is ordinarily carried out by treating the adducts with warm water, the water dissolving the urea, and the adduct-forming organic compounds are separated from the aqueous phase as a separate liquid or solid phase. Thus, although the prior art processes provide a ready means for the separation of a class of compounds having one type of molecular arrangement from a class of compounds having a different type of molecular arrangement, it is often desirable to separate one group of compounds within a single class from another group of compounds within that same class. Thus, it would appear to be highly desirable to possess a process which could fractionate a mixture of straight carbon atom chain organic compounds into various fractions thereof or a mixture of branched chain organic compounds into fractions thereof without resorting to the high temperatures incident to an ordinary fractional distillation process.

Therefore, it is an object of this invention to provide a process for the fractionation of a mixture of organic compounds.

It is another object of this invention to provide a process for the fractionation of a mixture comprised of a class of organic compounds having one type of molecular arrangement into two or more fractions thereof.

It is still another object of this invention to provide a process for the fractionation of a mixture composed of straight carbon atom chain compounds into fractions thereof without resorting to temperatures high enough to cause any decomposition of said compounds.

It is yet another object of this invention to provide a process for the fractionation of a class of organic compounds having a single type of carbon atom configuration into various fractions thereof by the selective formation and decomposition of adducts thereof with urea or thiourea.

Figure 2:
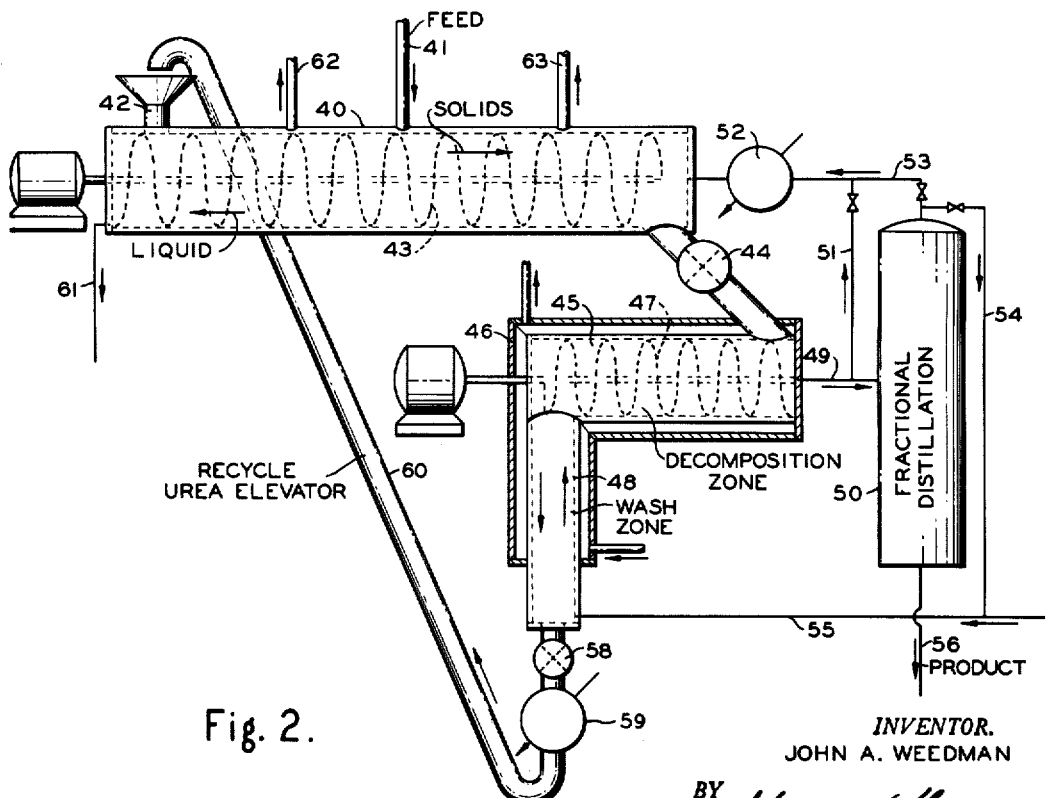

Additional objects of this invention will become apparent to one skilled in the art upon reading the disclosure and claims in conjunction with the attached drawings wherein Figures 1 and 2 illustrate preferred embodiments of the process of this invention.

It has been found that a mixture comprised of two or more organic compounds which are of the same molecular type of carbon atom configuration, e. g. straight-chain, so that they will form an adduct with an amide selected from the group consisting of urea and thiourea, can be separated into fractions thereof according to the stability of the adducts which they form with the amide employed by contacting the mixture with an amount of said amide which is insufficient to form an adduct with all of the organic compounds in said mixture. It has also been found that the more stable adduct-forming organic compounds will not only form an adduct with the amide but will displace less stable adduct-forming organic compounds from the adducted state. Thus, when a sufficient amount of amide is employed to form an adduct with the more stable adduct-forming organic compounds only, there will result, irrespective of any prior adduct formation between the amide and the less stable adduct-forming compounds, an adduct of the more stable adduct-forming organic compounds to the relative exclusion of the less stable adduct-forming compounds.

I have found that such an admixture of organic compounds which are capable of forming a solid adduct with said amide and which are of the same molecular type of carbon atom configuration can be separated into fractions according to the stability of the adducts which they form with the amide employed by passing them into a moving bed of said amide and refluxing the discharge end of said moving bed of amide with the more stable adduct-forming organic compounds in an amount sufficient to cause a substantial displacement of any adducted less stable adduct-forming organic compounds from the solid adduct state and thereby form an adduct more pure with respect to the more stable adduct-forming organic compounds. The less stable adduct-forming organic compounds can be passed counter-currently to the moving bed of amide to, in turn, displace still less stable adduct-forming compounds from the adducted state. As a result, the least stable adduct-forming organic compounds will be concentrated as a liquid fractionation at the influent end of the moving bed of amide and can be withdrawn therefrom. If desired, organic compounds which form adducts of intermediate stability can be withdrawn from the bed at corresponding intermediate points therein.

Still further, I have found that this same type of mixture of organic compounds having the same type of molecular carbon atom configuration can be fractionated by passing it into a moving bed of the selected amide and then by maintaining a temperature differential across the bed with the discharge end of the bed at a temperature sufficiently high to dissociate any adduct formed therein and the influent end of the bed at a temperature sufficiently below said high temperature that adduct formation can occur therebetween, the more stable adduct-forming organic compounds will form a solid adduct with the amide which moves into the hot end of the moving bed. At this end, the adduct will be decomposed or dissociated and a portion of the more stable adduct-forming organic compound can be recovered while sufficient of the remainder can be returned to the moving bed to act as reflux to displace less stable adduct-forming organic compounds from the adducted state thereby driving them toward the cooler end of the moving bed. These less stable adduct-forming compounds can be removed from said cool end as a separate fraction and other fractions which form adducts of intermediate stability can be withdrawn from the moving bed at corresponding intermediate points therein. A diluent which is preferably non-adduct-forming is passed countercurrently through the moving bed to act as a heat carrying medium and as a solvent for the displaced organic compounds.

A general description of the types of compounds which do and do not form adducts will be given in order to illustrate better the applicability of the process of this invention.

In general, an adduct can be formed by contacting a straight carbon atom chain organic compound with urea either with or without an activator such as methanol or water or the like present. The straight chain compounds can comprise one or more of a normal alkane or alkene hydrocarbon having from 6 to 50 carbon atoms in the molecule, such as hexane, the hexenes, heptane, the heptenes, octane, the octenes, nonane, the nonenes, decane, the decenes, and progressively higher molecular alkanes and alkenes including those having 50 carbon atoms. The straight carbon atom chain compound can also be a primary alcohol having from 6 to 50 carbon atoms being saturated or unsaturated and thus correspond in carbon atom configuration to the straight-chain hydrocarbons above-mentioned. Urea will also form adducts with such straight carbon atom chain compounds as primary amines having 6 to 50 carbon atoms per molecule, mercaptans having from 6 to 50 carbon atoms per molecule, ketones having from 3 to 50 carbon atoms per molecule, esters of organic acids having from 5 to 50 carbon atoms per molecule, and organic acids having from 4 to 50 carbon atoms per molecule.

Urea does not form adducts with branched carbon atom chain compounds nor with cyclic or aromatic organic compounds such as isohexane, methyl-octanes cyclohexane, benzene, toluene and cymene.

Thiourea forms adducts with branched carbon atom chain organic compounds but does not form adducts with straight carbon atom chain organic compounds nor with aromatic compounds. Thus, adduct-forming power of thiourea is substantially opposite to that of urea in that the thiourea forms adducts with branched-chain organic compounds and not with straight-chain organic compounds. Thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethyl hexane, isohexene, isoheptane, isoheptene, ethyl heptane, ethyl octane, trimethyl nonane, etc. Thiourea also forms an adduct with a secondary or tertiary alcohol having from 5 to 50 carbon atoms in the straight-chain portion of the molecule and 1 to 20 carbon atoms in a side chain; and with a ketone having from 5 to 50 carbons in the straight-chain portion of the molecule and from 1 to 20 carbon atoms in a side chain. Thiourea also forms an adduct with various cycloparaffins having at least 6 carbon atoms in the cyclic portion of the molecule and which can or cannot contain various side chains containing one or more carbon atoms per chain, such as cyclohexane, cycloheptane, cyclooctane, cyclononane, methyl cyclohexane, dimethyl cyclooctane, etc.

Activators which can be employed in my process to activate the adduct-forming reaction are preferably low-boiling oxygenated hydrocarbon derivatives such as methanol, ethanol, acetone, methylethyl ketone, propanol, secondary butyl alcohol and the like. Other known activators which will not chemically interfere with the process and which are easily separable from components of the mixture being resolved can be employed.

When employing the process of my invention it is preferred that the organic compounds in the mixture to be resolved all be members of a homologous series such as straight-chain hydrocarbons, alcohols, etc. In this manner the resolution will take place according to the molecular weight of the compounds, or according to the number of carbon atoms in the molecule. However, my invention should not be construed as so limited since it is applicable to the resolution of a mixture of organic compounds of similar carbon atom configuration not of the same homologous series. In this later instance the resolution will take place according to the stability of the adducts which the compounds form with the amide employed. Also, it is within the scope of my invention for the mixture of organic compounds being fractionated to contain compounds other than those having a single type of carbon atom configuration, as for example, a $C_7$ to $C_9$ cut from a hydrocarbon mixture containing aromatics, branched-chain hydrocarbons and straight-chain compounds. In this situation the non-adduct-forming compounds are removed from the adduct-forming zone in admixture with diluent and those less stable adduct-forming fractions removed downstream, with reference to the flow of liquids, from the point of entry of the original admixture.

Figures 1 and 2 represent schematic diagrams of two embodiments of my invention. By way of example and without intention of so limiting my invention, the description of the embodiments shown in Figures 1 and 2 describe the resolution of a mixture of straight-chain hydrocarbons according to their molecular weight using urea as the complex-forming agent.

Referring to Figure 1, an admixture of straight carbon atom chain hydrocarbons to be fractionated enters an adduct-forming zone, such as horizontal column 10, through line 11. Crystalline urea enters column 10 through conduit 12. The urea is present in the system substantially in the solid phase and ranges in particle size from 5 to 200 mesh and preferably 25 to 100. The urea is moved through vessel 10 from its point of entrance by any suitable mechanical means, such as auger 13, as illustrated, or by means of porous pistons which are so constructed and arranged that the piston heads are pivoted about a diameter thereof in such a manner that they form porous piston heads across the cross-section of column 10 during the driving stroke thereof and push the urea before them and, upon reaction stroke thereof, each half of said piston heads pivot together along said diameter to permit their retraction through the urea without pulling it back in a direction from whence it was just pushed, said piston heads allowing liquids to flow freely therethrough. Column 10 is equipped with a cooling means, such as jacket 14, adapted to cool the urea and/or any fluids passing through the end of the vessel in which the urea is injected. The other end of column 10 is fitted with heating means, such as jacket 15, adapted to heat any adduct and/or fluids passing through that end. In this manner, fluid passing countercurrently to the moving bed of urea and/or adduct in column 10 can act as a heat carrier to maintain a temperature differential across the length of column 10 with the decrease in temperature being in the direction opposite to that of the moving bed. The temperatures at which the cold and hot ends are maintained vary depending upon the mixture being treated and the degree of separation desired. Generally, the cold end is maintained at a temperature within the range of minus 70 to 100° F. and the hot end at a temperature within the range of 80 to 270° F. in the case of urea and 80 to 350° F. in the case of thiourea. As shown in the drawing, the heated end of column 10 can be formed to have a wash column 16 into which the crystalline urea is deposited from column 10 by operation of auger 13. According to this embodiment of the invention, the feed material containing a mixture of straight-chain hydrocarbons enters horizontal column 10 through line 11, and the cooled end of column 10 in the region of jacket 14 is maintained at a temperature sufficiently low to cause all of the adduct-forming hydrocarbons, or all but a selected fraction of the hydrocarbons, to adduct with urea at that temperature, while the other end of column 10 in the region of jacket 15 is maintained at a temperature sufficiently high to cause complete dissociation of any and all adducts formed in column 10. As the mixture of straight-chain hydrocarbons introduced through line 11 passes into column 10, the longest chain or most readily adduct-forming fraction or fractions thereof forms an adduct with the urea and is transported by auger 13 toward the hot end of column 10 while those fractions which do not form an adduct with urea at the temperature existing at the point where the mixture is introduced into column 10 pass toward the cooled end of column 10 countercurrently to the amide and/or adduct moving therethrough. As the adduct moves toward the hot end of column 10, the more readily dissociated adducts therein are decomposed to liberate hydrocarbons therefrom, while the most stable adduct remains undissociated until it reaches said hot end, where it is decomposed. Thus, the longest chain or most stable adduct-forming hydrocarbons are removed from column 10 via line 17 and passed to fractional distillation zone 18 wherefrom they are removed as a separate fraction through line 19.

A liquid diluent, such as a low-boiling hydrocarbon, or any fluid which is readily separable from the hydrocarbons being fractionated, and inert to urea at the conditions prevailing, is preferably passed into the system through line 20 and thence to wash column 16 to pass upwardly therethrough countercurrently to the descending column of liberated urea. Suitable substances which may be used as diluent include butane, n-pentane, isopentane, n-hexane, isohexane, 3-methyl pentane, 2,2-dimethyl pentane, 2,2-dimethyl butane, etc. The diluent should be judiciously chosen depending upon the mixture of compounds being treated. A portion of this diluent passes out through line 17 with some of the liberated hydrocarbon, and activator if used, to be separated in fractional distillation zone 18 and returned to the system via line 21. If the boiling point of the activator, when used, is near to that of the diluent so that separation from the diluent is not feasible, it may be recycled along with the diluent. The remaining portion of diluent flows through column 10 countercurrently to the urea or adduct contained therein and is removed through line 22 with the fraction of hydrocarbons which does not form an adduct with urea under the conditions employed in column 10. In so flowing the diluent enhances the transfer of heat along column 10 while transporting hydrocarbons toward the cold end of the column.

As stated, the liberated urea passes downwardly from the hot end of column 10 to a washing zone such as wash column 16 wherein it is contacted with diluent from line 20 thereby being washed free from any occluded impurities, such as the hydrocarbons contained in column 10. The condensed diluent from fractional distillation zone 18 as it first contacts the liberated urea is usually at a temperature sufficiently low to help cool the recycle urea before admitting it to the cool influent end. After leaving wash column 16, the liberated urea passes through a discharge mechanism, such as star valve 23, into a solid transporting device, such as elevator 24, and is returned to conduit 12 and the cooled end of vessel 10. Elevator 24 may be an air lift which helps cool the urea further by evaporating occluded diluent.

Intermediate fractions of the mixture introduced into column 10 can be withdrawn through lines 25 and 26 along with a portion of the diluent present at those points in the column. The diluent can be readily separated from these removed fractions by ordinary fractional distillation as hereinbefore described and can be returned, if desired, to line 20 for further use in the process.

In a second embodiment of my invention the entire reaction zone is kept at a temperature below the dissociation temperature of the adducts formed, preferably below 100° F. Reflux hydrocarbon and diluent (and activator if employed) are cooled before entering the reaction zone. Urea in quantity sufficient to react with only a portion of the mixture of straight-chain hydrocarbons is circulated through the system. Figure 2 is a schematic diagram of a second embodiment as above-mentioned.

Referring now to Figure 2, the admixture of straight-chain hydrocarbons to be fractionated enters a reaction zone, such as horizontal column 40, through line 41. Crystalline urea at a temperature below the dissociation temperature of any adduct formed and in insufficient quantity to react with all the straight-chain hydrocarbon, enters column 40 at the influent end through conduit 42. The urea is moved through column 40 from its point of entrance by any suitable mechanical means, such as auger 43 as illustrated, or by means of porous pistons as described in the first embodiment. As adduct formation is slightly exothermic, column 40 may be equipped with means (not shown) to cool it below the dissociation temperature of any adduct formed. The feed material of this embodiment is the same as that described in the first. As this admixture of straight-chain hydrocarbons introduced through line 41 passes into column 40, the most readily adduct-forming fraction or fractions thereof forms an adduct with urea and displaces any hydrocarbon of fewer carbon atoms from adduct and is transported by auger 43 toward the effluent end of the column, while those fractions which have been displaced and for which there is insufficient urea pass toward the influent end of the column. The displaced hydrocarbon acts as internal reflux and in turn displaces any adducted hydrocarbon of fewer carbon atoms, thus providing a continuous rectification. When the adduct of the longest chain fraction reaches the effluent end of column 40 it passes through star valve 44 into decomposing zone 45 which is heated by any conventional means, such as heating jacket 46, above the dissociation temperature of the adduct. The regenerated urea is moved to the opposite end of the decomposition zone by suitable mechanical means, such as auger 47, and then into washing zone 48 where it is washed with a countercurrently flowing stream of diluent, such as described in the first embodiment. The diluent passes from washing zone 48 through decomposing zone 45 countercurrently to the urea and together with the liberated hydrocarbon passes through line 49 to fractional distillation zone 50. A portion of the liquid effluent from decomposition zone 45 is passed as reflux through line 51 and after cooling in heat exchanger 52 back into column 40. The diluent is usually recovered as distillate from zone 50, a portion of which goes through line 53 and heat exchanger 52 to column 40. This portion together with reflux paraffin moves through column 40 countercurrently to the flow of adduct. If necessary a pump may be employed to accomplish the countercurrent flow. The other portion of the diluent goes through lines 54 and 55 and is used as wash for the urea. As mentioned in the first embodiment, the condensed diluent is usually at a sufficiently low temperature to help cool the recycle urea to operating temperature. The urea leaving the bottom of the washing zone passes through star valve 58 and if necessary is cooled in heat exchanger 59 to the operating temperature of column 40. From there is passes to a transporting device, such as elevator 60, where it is carried to conduit 42 and deposited in the influent end of column 40. Elevator 60 may be any of the conventional lifting means. As hereinbefore stated, it is advantageous to employ a gas lift which concomitantly lifts the urea and evaporates some occluded diluent thus helping to cool the urea to operating temperature, as well as removing some of the diluent which would ordinarily be carried over with shortest-chain hydrocarbon or raffinate through line 61. The vaporized diluent can be condensed and returned to the system.

The longest-chain hydrocarbon is recovered as bottoms from fractional distillation zone 50 through line 56. That fraction for which there was insufficient urea is recovered, admixed with diluent, through line 61 at the influent end of column 40. If desired, intermediate fractions of the mixture of straight-chain hydrocarbons introduced into column 40 can be withdrawn through lines 62 and 63 along with a portion of the diluent present at those points in the column. The diluent can be readily separated from these intermediate fractions by ordinary fractional distillation and can be removed, if desired, to line 55 for further use in the process. If an activator is employed in the process, it may be admitted into the system admixed with the diluent or with the hydrocarbon feed, or with the urea.

In carrying out the process of my invention one skilled in the art will appreciate that such things as the degree of separation and product purity will depend upon such factors as the nature of the feed material, feed rate, amide circulation rate, length of the column, reflux rate, operating temperatures, the point at which feed or reflux enters the column, etc. The solution of these problems is considered within the skill of the art.

While my invention has been described in terms of preferred embodiments thereof, it is to be understood that this description is illustrative only and is not intended to limit the invention, the scope of which is defined by the claims.

I claim:

1. A process for fractionating into at least two fractions a mixture of organic compounds selected from the group consisting of a mixture of $C_3$ to $C_{50}$ straight chain organic compounds and a mixture of $C_5$ to $C_{50}$ branched chain organic compounds, at least two of the compounds in said mixture being capable of forming a solid adduct with an amide selected from the group consisting of urea and thiourea, which comprises continuously moving by positive displacement from an influent end solid amide aggregated into a mass through an adduct-forming zone, continuously feeding the mixture to be fractionated to said zone at a point intermediate the influent and effluent ends thereof to contact said moving mass of amide, continuously decomposing less stable solid adduct formed as it moves toward the effluent end of said zone whereby the less stable adduct is substantially completely eliminated from the effluent adduct, continuously passing a liquid diluent easily separable from the several fractions and inert to the amide at the conditions existing in said zone through said zone countercurrently to the flow of solids, continuously removing effluent from said effluent end, continuously separating said effluent into solid amide and diluent admixed with the fraction which forms more stable adducts with the amide employed, continuously separating diluent from said admixture, continuously washing the amide separated from said effluent free from occluded organic compound with liquid diluent, continuously passing said diluent from said washing operation to the effluent end of said adduct-forming zone, continuously recycling said washed amide to the influent end of said zone, continuously removing liquid diluent from said influent end and admixed with the fraction which forms less stable adducts with the amide employed, continuously separating diluent from said admixture, and recovering the fraction which forms the less stable adduct with the amide employed.

2. A process for fractionating into at least two fractions a mixture of organic compounds selected from the group consisting of a mixture of $C_3$ to $C_{50}$ straight chain organic compounds and a mixture of $C_5$ to $C_{50}$ branched chain organic compounds, at least two of the compounds in said mixture being capable of forming a solid adduct with an amide selected from the group consisting of urea and thiourea, which comprises continuously moving by positive displacement from an influent end solid amide aggregated into a mass through an adduct-forming zone, maintaining the influent end of said zone at a temperature to form adducts of at least two of said organic compounds, maintaining the effluent end of said zone above the decomposition temperature of any adducts formed, continuously passing said mixture to said zone at a point intermediate the influent and effluent ends, continuously passing through said zone from said effluent end countercurrently to the flow of solids a liquid diluent easily separable from the several fractions and inert to the amide at the conditions existing in said zone, continuously removing separately from said effluent end solid amide and liquid diluent admixed with a fraction which forms more stable adducts with the amide employed, continuously separating diluent from said admixture, continuously passing said solid amide removed from the effluent end of the adduct-forming zone to a washing zone where it is washed with liquid diluent, continuously passing the liquid effluent from said washing zone to the effluent end of said adduct-forming zone, continuously cooling and recycling said washed amide to the influent end of said adduct-forming zone, continuously removing from said influent end liquid diluent admixed with a fraction which forms less stable adducts with the amide employed, continuously removing at points intermediate the influent and effluent ends of said adduct-forming zone liquid mixtures of diluent and fractions which form adducts of intermediate stability, separating diluent from each of said admixtures and recovering various fractions of the original mixture of organic compounds.

3. A process according to claim 2 in which the mixture of organic compounds is a mixture of $C_3$ to $C_{50}$ straight chain compounds and the amide is urea.

4. A process according to claim 2 in which the mixture of organic compounds is a mixture of $C_5$ to $C_{50}$ branched chain compounds and the amide is thiourea.

5. A process according to claim 2 in which the mixture of organic compounds is a mixture of $C_3$ to $C_{50}$ straight chain hydrocarbons and the amide is urea.

6. A process according to claim 2 in which the mixture of organic compounds is a mixture of $C_5$ to $C_{50}$ branched chain hydrocarbons and the amide is thiourea.

7. A process for fractionating a mixture of $C_3$ to $C_{50}$ straight chain hydrocarbons, at least two of which are capable of forming an adduct with urea, into various fractions thereof which comprises continuously moving by positive displacement from an influent end solid urea of particle size within the range of 5 to 200 mesh aggregated into a mass through an adduct-forming zone, maintaining the influent end of said zone at a temperature in the range of minus 70° to 100°F., maintaining the effluent end of said zone at a temperature in the range of 80° to 270°F., continuously passing said mixture of straight-chain hydrocarbon to said zone at a point intermediate the influent and effluent ends, continuously passing through said zone from said effluent end countercurrently to the moving solids liquid isopentane, continuously removing separately from said effluent end solid urea and liquid isopentane admixed with the longer-chain hydrocarbons, continuously separating isopentane from said admixture, continuously passing the urea removed from the effluent end of the adduct-forming zone to a washing zone where it is washed with liquid isopentane, continuously passing the liquid effluent from said washing zone to the effluent end of said adduct-forming zone, continuously cooling and recycling said washed urea to the influent end of said adduct-forming zone, continuously removing from said influent end liquid isopentane admixed with the shorter-chain hydrocarbons, continuously removing at points intermediate the influent and effluent ends of said adduct-forming zones liquid admixtures of isopentane and straight-chain hydrocarbons of intermediate-length chain, separating isopentane from each of said admixtures and recovering various fractions of the original mixture of straight chain hydrocarbons.

8. A process for fractionating a mixture of organic compounds selected from the group consisting of a mixture of $C_3$ to $C_{50}$ straight chain organic compounds and a mixture of $C_5$ to $C_{50}$ branched chain organic compounds, at least two of the compounds in said mixture being capable of forming a solid adduct with an amide selected from the group consisting of urea and thiourea, into various fractions thereof which comprises continuously moving by positive displacement from an influent end solid amide aggregated into a mass in quantity insufficient to react with all of said organic compounds through an adduct-forming zone, maintaining said zone at a temperature to form adducts of at least two of said organic compounds, continuously passing said mixture to said zone at a point intermediate the influent and effluent ends, continuously passing through said zone from said effluent end countercurrently to the flow of solids a liquid diluent easily separable from the several fractions and inert to the amide at the conditions existing in said zone and reflux organic compounds, continuously removing from said effluent end solid adduct, passing said adduct to a decomposition zone, continuously removing from said decomposition zone solid amide and passing same to a washing zone, continuously washing said solid amide with liquid diluent and passing the liquid effluent from said washing zone to said decomposition zone, continuously removing from said decomposition zone liquid diluent admixed with the fraction forming more stable adducts with the amide employed, continuously separating from said admixture liquid diluent, continuously cooling to the proper temperature and recycling said washed amide to the influent end of said adduct-forming zone, continuously removing from said influent end of said adduct-forming zone liquid diluent admixed with the fraction which forms less stable adducts with the amide employed, continuously removing at points intermediate the influent and effluent ends of said adduct-forming zone fractions in the liquid phase which form adducts of intermediate stability with the amide employed, continuously separating from each of said admixtures diluent and recovering therefrom various fractions of the orginal mixture of organic compounds.

9. A process according to claim 8 in which the mixture of organic compounds is a mixture of $C_3$ to $C_{50}$ straight chain compounds and the amide is urea.

10. A process according to claim 8 in which a mixture of organic compounds is a mixture of $C_5$ to $C_{50}$ branched chain compounds and the amide is thiourea.

11. The process according to claim 8 in which the mixture of organic compounds is a mixture of $C_3$ to $C_{50}$ straight chain hydrocarbons and the amide is urea.

12. A process according to claim 8 in which the mixture of organic compounds is a mixture of $C_5$ to $C_{50}$ branched chain hydrocarbons and the amide is thiourea.

13. A process for fractionating a mixture of $C_3$ to $C_{50}$ straight chain hydrocarbons, at least two of which are capable of forming a solid adduct with urea, into various fractions thereof which comprises continuously moving by positive displacement from an influent end solid urea aggregated into a mass and in particle size within the range of 5 to 200 mesh and in quantity insufficient to react with all of said straight-chain hydrocarbons through an adduct-forming zone, maintaining said adduct-forming zone at a temperature within the range of minus 70° to 100° F., continuously passing said mixture of hydrocarbons to said zone at a point intermediate the influent and effluent ends, continuously passing through said zone from said effluent end countercurrently to the flow of solids isopentane, continuously removing from said effluent end solid adduct and passing said solid adduct to a decomposition zone, maintaining said decomposition zone at a temperature within the range of 80 to 270° F., continuously removing from said decomposition zone solid urea and passing said urea to a washing zone, continuously washing said urea with liquid isopentane, continuously passing the liquid effluent from said washing zone to said decomposition zone, continuously removing from said decomposition zone liquid isopentane and the longer-chain hydrocarbons, continuously cooling to the proper temperature and passing a portion of said admixture to the effluent end of said adduct-forming zone to act as reflux, continuously separating isopentane from the other portion of said admixture, continuously cooling to the proper temperature and recycling to the influent end washed solid urea, continuously removing from the influent end of said adduct-forming zone isopentane admixed with the shorter-chain hydrocarbons, continuously removing at points intermediate the influent and effluent ends of said zone hydrocarbons of intermediate-length chain in the liquid phase, continuously separating from each of said admixtures isopentane and recovering the various fractions of the original mixture of straight-chain hydrocarbons.

References Cited in the file of this patent

UNITED STATES PATENTS

| | | |
|---|---|---|
| 2,386,366 | Storment | Oct. 9, 1945 |
| 2,499,820 | Fetterly | Mar. 7, 1950 |
| 2,540,977 | Arnold | Feb. 6, 1951 |
| 2,557,257 | Melrose | June 19, 1951 |
| 2,577,202 | Lien et al. | Dec. 4, 1951 |
| 2,588,602 | Adams et al. | Mar. 11, 1952 |
| 2,640,051 | Lynch | May 26, 1953 |

OTHER REFERENCES

Australian application 17339/47, available April 16, 1948 (24 pages spec., now dwg).